(12) United States Patent
Porter (10) Patent No.: US 10,312,822 B2
(45) Date of Patent: Jun. 4, 2019

(54) ELECTRICAL SYSTEMS AND METHODS FOR ISLANDING TRANSITIONS

(71) Applicant: S&C Electric Company, Chicago, IL (US)

(72) Inventor: David Glenn Porter, East Troy, WI (US)

(73) Assignee: S&C Electric Company, Chicago, IL (US)

( * ) Notice: Subject to any disclaimer, the term of this patent is extended or adjusted under 35 U.S.C. 154(b) by 217 days.

(21) Appl. No.: 15/380,278

(22) Filed: Dec. 15, 2016

(65) Prior Publication Data

US 2017/0179847 A1    Jun. 22, 2017

Related U.S. Application Data

(60) Provisional application No. 62/269,404, filed on Dec. 18, 2015.

(51) Int. Cl.
*H02J 3/38* (2006.01)
*H02M 1/08* (2006.01)
(Continued)

(52) U.S. Cl.
CPC .............. *H02M 7/44* (2013.01); *H02J 3/383* (2013.01); *H02J 3/386* (2013.01); *H02J 3/387* (2013.01);
(Continued)

(58) Field of Classification Search
CPC ...... H02M 7/44; H02J 3/32; H02J 3/38; H02J 2003/388; H02J 3/383; H02J 3/386; H02J 3/387; H02J 3/40
See application file for complete search history.

(56) References Cited

U.S. PATENT DOCUMENTS 6,810,339 B2   10/2004 Wills
7,138,728 B2   11/2006 LeRow et al.
(Continued)

FOREIGN PATENT DOCUMENTS

WO    2012106389 A2    8/2012

OTHER PUBLICATIONS

United States International Searching Authority, International Search Report and Written Opinion for International Application No. PCT/US16/67215 dated Apr. 28, 2017.
(Continued)

*Primary Examiner* — Gary L Laxton
*Assistant Examiner* — Ivan Laboy (57) ABSTRACT

An electrical system includes a sensing arrangement coupled to an electrical grid interface to measure an electrical characteristic of the electrical grid interface, a power conversion module having an output coupled to the electrical grid interface, and a control module coupled to the sensing arrangement and the power conversion module. The control module determines a reference value for the electrical characteristic, identifies an islanding condition based on a difference between a value for the electrical characteristic and the reference value, determines a target output value for the power conversion module based on the difference, and in response to the islanding condition, operates the power conversion module to provide the target output value for the electrical characteristic at the output. The target output value reduces the difference while a connection arrangement is being opened to achieve islanding.

20 Claims, 4 Drawing Sheets

(51) Int. Cl.
*H02M 1/32* (2007.01)
*H02M 7/44* (2006.01)
*H02M 1/42* (2007.01)
*H02M 1/00* (2006.01)

(52) U.S. Cl.
CPC .............. *H02M 1/08* (2013.01); *H02M 1/32* (2013.01); *H02M 1/42* (2013.01); *H02J 2003/388* (2013.01); *H02M 2001/0009* (2013.01); *Y02E 10/563* (2013.01); *Y02E 10/763* (2013.01)

(56) References Cited

U.S. PATENT DOCUMENTS

| | | | | |
|---|---|---|---|---|
| 10,103,545 | B2* | 10/2018 | Ding | H02J 3/38 |
| 2008/0100145 | A1* | 5/2008 | Ito | H02J 3/38 |
| | | | | 307/125 |
| 2012/0068540 | A1 | 3/2012 | Luo et al. | |
| 2012/0306515 | A1* | 12/2012 | Barnes | H02J 3/383 |
| | | | | 324/707 |
| 2013/0158901 | A1* | 6/2013 | Sahinoglu | G01R 29/16 |
| | | | | 702/58 |
| 2014/0139260 | A1* | 5/2014 | Shankar | H02S 50/00 |
| | | | | 324/764.01 |
| 2015/0249416 | A1* | 9/2015 | Barker | H02M 5/42 |
| | | | | 290/44 |
| 2015/0288224 | A1* | 10/2015 | Allert | H02J 3/38 |
| | | | | 307/64 |

OTHER PUBLICATIONS

Llaria et al., "Survey on microgrids: Unplanned islanding and related inverter control techniques." Renewable Energy 36 (Aug. 2011)2052-2061; section 5.1 [online] <URL: http://www.sciencedirect.com/science/article/pii/S0960148111000176>.

Steven W. Blume, Electric Power System Basics for the Nonelectrical Professional, IEEE Press Series of Power Engineering, pp. 186-201, Institute of Electrical and Electronics Engineers, Inc., 2007, John Wiley & Sons, Inc., Hoboken, New Jersey, USA.

The International Bureau of WIPO, International Preliminary Report on Patentability for International Application No. PCT/US2016/067215 dated Jun. 28, 2018.

* cited by examiner

ELECTRICAL SYSTEMS AND METHODS FOR ISLANDING TRANSITIONS

CROSS-REFERENCE TO RELATED APPLICATION(S)

This application claims the benefit of U.S. provisional patent application Ser. No. 62/269,404, filed Dec. 18, 2015, the entire content of which is incorporated by reference herein.

TECHNICAL FIELD

The subject matter described herein relates generally to electrical systems, and more particularly, to disconnecting microgrid systems from an electrical grid.

BACKGROUND

Advances in technology have led to substantial changes to electrical distribution systems as they evolve towards a so-called "smart grid" that supports distributed energy generation from solar, wind, and other distributed energy sources in a resilient and adaptive manner. One advancement is the deployment of localized electrical systems or "microgrids," which are capable of disconnecting from a larger utility grid (or backbone grid) and operating autonomously, alternatively referred to as "islanding." However, in some situations, voltage disturbances on the larger utility grid can propagate to the microgrid before the microgrid is disconnected, or disconnecting two electrical grid systems may otherwise result in voltage fluctuations due to varying impedances and the like. This is undesirable, for example, when the microgrid system includes one or more electrical loads that are sensitive to voltage changes or voltage transients. Accordingly, it is desirable to provide systems and methods capable of mitigating voltage disturbances when disconnecting a microgrid system. Furthermore, other desirable features and characteristics of the present invention will become apparent from the subsequent detailed description and the appended claims, taken in conjunction with the accompanying drawings and the foregoing technical field and background.

BRIEF SUMMARY

Electrical systems and related operating methods are provided. An exemplary electrical system includes a sensing arrangement coupled to an electrical grid interface to measure an electrical characteristic of the electrical grid interface, a power conversion module having an output coupled to the electrical grid interface, and a control module coupled to the sensing arrangement and the power conversion module. The control module determines a reference value for the electrical characteristic at the electrical grid interface, identifies an islanding condition based on a difference between a measured value for the electrical characteristic and the reference value, determines a target output value for the power conversion module based on the difference, and in response to the islanding condition, operates the power conversion module to provide the target output value for the electrical characteristic at the output.

In another embodiment, an electrical system includes a connection arrangement coupled in series between an external electrical grid and an electrical grid interface node, a voltage sensing arrangement coupled to the electrical grid interface node to measure a voltage at the electrical grid interface node, and an energy storage system coupled to the connection arrangement and the voltage sensing arrangement. The energy storage system includes an energy storage element, an inverter module coupled between the energy storage element and the electrical grid interface node and having its output coupled to the electrical grid interface node, and a control module coupled to the sensing arrangement, the connection arrangement and the inverter module. The control module determines a reference voltage at the electrical grid interface node, identifies an islanding condition based on the measured voltage relative to the reference voltage, and determines a target output voltage for the inverter module based on the measured voltage relative to the reference voltage. In response to the islanding condition, the control module operates the connection arrangement to electrically disconnect the electrical grid interface node from the external electrical grid and also operates the inverter module in a voltage source mode to provide the target output voltage at its output.

An embodiment of a method of transitioning a microgrid system to an islanded state is also provided. The method involves determining a reference value for an electrical characteristic at an electrical grid interface coupled to an external electrical grid via a connection arrangement based on measurements obtained via one or more sensing arrangements and identifying an islanding condition based on a difference between a measurement obtained via the one or more sensing arrangements relative to the reference value. The method determines a target output value for a power conversion module coupled between the electrical grid interface and an energy storage element based on the difference, and in response to the islanding condition, the connection arrangement is operated to electrically disconnect the electrical grid interface from the external electrical grid and the power conversion module is operated to provide the target output value for the electrical characteristic while the connection arrangement is in the process of disconnecting the external electrical grid.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Embodiments of the subject matter described herein relate to mitigating electrical disturbances while transitioning an electrical system to an islanded state where the electrical system is disconnected from an external electrical grid. The electrical system includes an energy storage system having a power conversion module coupled between an energy storage element and an interface with the electrical grid. In response to a condition where the electrical system should be transitioned from being connected to the electrical grid to an islanded state, the power conversion module is operated in a manner that mitigates the electrical disturbance at the electrical grid interface while the electrical system is disconnected from the grid. In this regard, operation of the switches, fuses, circuit breakers, or other connection components to disconnect from the electrical grid interface is not instantaneous, and even momentary utility power disturbances can adversely affect the operation of sensitive electronic equipment (e.g., unscheduled controller resets, shutdown of a factory assembly lines, loss of computer data, etc.). Accordingly, the power conversion module is operated to achieve a voltage at the grid interface that mitigates the impact of external grid disturbances on components of the electrical system during the time period required to disconnect from the grid.

As described in greater detail below, the energy storage system includes a control module coupled to the electrical grid interface via one or more sensing arrangements configured to measure instantaneous (or current) values of an electrical characteristic at the grid interface. The control module detects or otherwise identifies an islanding condition based on a difference between a recent measurement for the electrical characteristic at the grid interface and a reference value for the grid interface, which, depending on the embodiment, can be a nominal value for the external electrical grid (e.g., the nominal grid voltage) or an average value that is dynamically determined based on recent measurements (e.g., a moving average of the measured grid voltage over a preceding time period). In this regard, in some embodiments, the recent measurement may be realized as a moving average of an instantaneous or most recent measurement value and preceding measurement values obtained during a preceding period of time, which may equal the duration of the preceding time period over which the reference value is determined.

As one example, the islanding condition may be a sag condition detected by the control module when a difference between the measured voltage at the grid interface and the reference voltage indicates the grid voltage is less than the reference voltage by at least a sag detection threshold amount, which may be a fraction of the reference voltage. As another example, the islanding condition may be a surge condition detected by the control module when the difference between the measured voltage at the grid interface and the reference voltage indicates the grid voltage is greater than the reference voltage by at least a surge detection threshold amount. In various embodiments, the measured voltage could be realized as a fast root-mean-square (RMS) voltage, such as a sliding half cycle RMS voltage, or an instantaneous average of the three phase in-phase voltages (e.g., the d axis voltage). That is to say, the measured voltage could include or be realized as an instantaneous measurement of the voltage, the current or most recently obtained valid measurement of the voltage, an average or combination of a plurality of instantaneous or most recently obtained voltage measurements across multiple phases, or a combination of one or more instantaneous or most recent voltage measurements and one or more preceding voltage measurements.

Based on the difference between the measurement value and the reference value, the control module determines a target output value for the power conversion module configured to reduce, minimize, or otherwise mitigate the difference between the instantaneous value for the electrical characteristic at the grid interface and the reference value. In exemplary embodiments, when the difference indicates the voltage at the grid interface is less than the reference voltage, the control module determines a target output voltage that is greater than the reference voltage to raise the grid voltage at the grid interface. In some embodiments, the target output voltage may be a fixed amount or multiple of the reference voltage (e.g., 105% of the reference voltage), while in other embodiments, the control module may calculate the target output voltage in real-time based on the current grid voltage, the reference voltage for the grid interface, and the relationship between the impedance between the output of the power conversion module and the grid interface relative to the impedance associated with the grid, as described in greater detail below. Similarly, when the difference indicates the grid voltage at the grid interface is greater than the reference voltage, the control module determines a target output voltage that is less than the reference voltage to lower the grid voltage at the grid interface.

After detecting the islanding condition, the control module automatically operates a connection arrangement to electrically disconnect the electrical system from the electrical grid while concurrently operating the power conversion module to achieve the target output value at its output. For example, the control module may operate the power conversion module in a voltage source mode (e.g., as an AC voltage source) to output a balanced target voltage that is in phase with the external electrical grid voltage. Thus, during the amount of time between when the time when the control module signals the connection arrangement to begin initiating the disconnection and the time when the disconnection is achieved, the operation of the power conversion module adjusts or otherwise alters the voltage at the grid interface in a manner that counteracts the electrical disturbance on the electrical grid, thereby protecting sensitive equipment or components. Once the electrical system is disconnected, the control module may begin operating the power conversion module to emulate the electrical grid prior to the islanding condition, such that the islanded state is substantially imperceptible to components of the electrical system. For example, the control module may operate the power conversion module in a voltage source mode to provide a balanced voltage having substantially the same magnitude and frequency as the electrical grid voltage prior to the disturbance.

Figure 1:
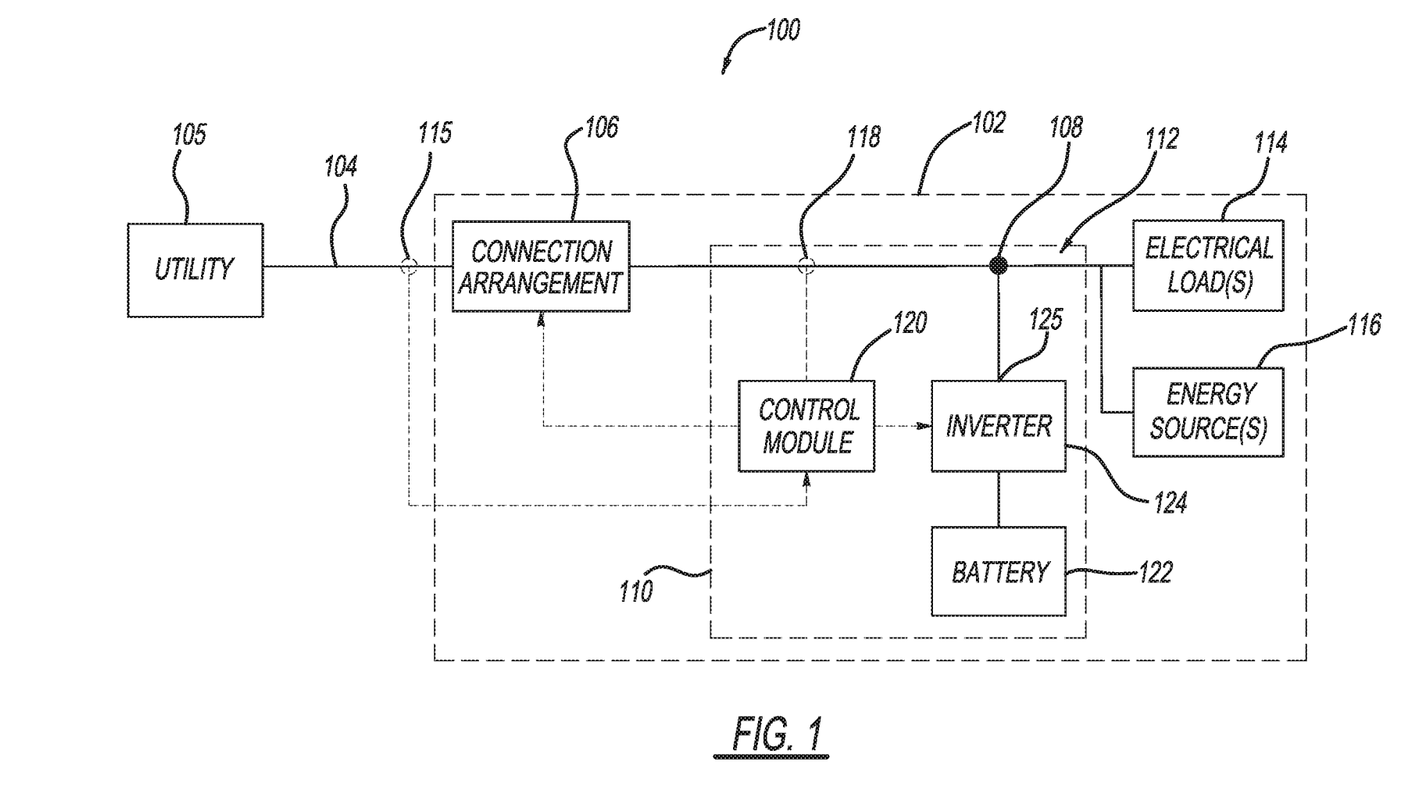
FIG. 1 is a schematic view of an electrical distribution system in one or more exemplary embodiments.

FIG. 1 depicts an exemplary embodiment of an electrical distribution system 100 that includes a microgrid electrical system 102 capable of being selectively connected to an external electrical grid 104 via a connection arrangement 106. The electrical grid 104 generally represents the distribution lines (or feeders), transformers, and other electrical components that provide an electrical interconnection between the microgrid system 102 and one or more external electrical power source(s) 105, which may be provided, for example, by a public utility. Accordingly, for purposes of explanation but without limitation, the electrical power source(s) 105 external to the microgrid system 102 may alternatively be referred to herein as the "utility" and the electrical grid 104 may alternatively be referred to herein as the "utility grid;" however, the subject matter is not limited to traditional utility distribution systems, and in various embodiments, the electrical power source(s) 105 may include one or more additional microgrid systems, distributed energy sources, or the like. Additionally, for purposes of explanation but without limitation, "upstream" or variants thereof may be used herein with reference to locations on or along the electrical grid 104 outside of the microgrid system 102 on a first side of the connection arrangement 106, while "downstream" or variants thereof may be used herein with reference to locations within the microgrid system 102 on the opposite side of the connection arrangement 106.

The illustrated microgrid system 102 includes an energy storage system 110 that is connected to the electrical grid 104 downstream of the connection arrangement 106 at an interface node 108 (or interconnect point) where electrical signals on the electrical grid 104 interfaces with electrical signals on the microgrid distribution arrangement 112. In this regard, the microgrid distribution arrangement 112 generally represents the buses, wiring, lines, and/or other electrical components capable of providing electrical interconnections between the electrical grid 104 and/or the energy storage system 110 to one or more electrical loads 114 and/or one or more electrical energy sources 116 within the microgrid system 102. The electrical loads 114 generally represent any devices, systems, components or appliances that receive electrical power from the microgrid distribution arrangement 112 for operation, such as, for example, one or more computer systems or other computing equipment (e.g., computers, servers, databases, networking components, or the like), medical equipment or devices, household appliances, or the like. The energy sources 116 generally represent any devices, systems, or components capable of generating electrical power that may be provided back out to the microgrid distribution arrangement 112, for example, to support operations of the electrical load(s) 114 or to deliver electrical power back to the grid 104. The energy sources 116 may include, for example, one or more wind turbines, solar panels or other photovoltaic components, electrical generators, fuel cells, batteries, or the like.

In the illustrated embodiment, the energy storage system 110 includes a control module 120 configured to regulate power flow at the electrical grid interface 108, an energy storage element 122, and a power conversion module 124 coupled between the energy storage element 122 and the electrical grid interface 108. In exemplary embodiments, the energy storage element 122 is realized as a battery capable of receiving electrical energy from the electrical grid interface 108 via the power conversion module 124 and storing the received electrical energy; accordingly, for purposes of explanation and without limitation, the energy storage element 122 is alternatively referred to herein as a battery. Additionally, the battery 122 may provide electrical energy to the electrical grid interface 108 via the power conversion module 124. In this regard, the power conversion module 124 supports bidirectional flow of electrical current to/from the electrical grid interface 108.

In exemplary embodiments, the power conversion module 124 is bidirectional and realized as a four-quadrant three-phase full bridge inverter capable of rectifying three-phase alternating current (AC) electrical signals at the electrical grid interface 108 to a direct current (DC) signal provided to the battery 122 when the battery 122 is receiving electrical energy from the electrical grid interface 108 (or charging). Conversely, the inverter is also capable of converting DC input signals from the battery 122 into corresponding three-phase AC output signals at the electrical grid interface 108 when the battery 122 is providing electrical energy to the electrical grid interface 108 (or discharging). For purposes of explanation and without limitation, the power conversion module 124 is alternatively referred to herein as an inverter or inverter module. As described in greater detail below, the control module 120 is coupled to the inverter 124 and operates the switching elements or other actuatable components of the inverter 124 to achieve so-called "four quadrant" operation and regulate both the real and reactive power flow at the electrical grid interface 108 when connected to another voltage (or power) source (e.g., utility 105). It should be noted that although the subject matter may be described herein in the context of achieving a target voltage at an interface 125 of the power conversion module 124 referred to herein as the output for purposes of explanation, depending on the embodiment and particular quadrant of operation for a bidirectional power conversion module 124, current may flow into the power conversion module 124 at the so-called output 125. Accordingly, the term output is not intended to impose any constraint on the power flow at the interface 125 of the power conversion module 124.

The control module 120 generally represents the hardware, circuitry, processing logic, and/or other electronic components configured to control operation of the inverter 124 to regulate the power flow to/from the microgrid system 102 and support transitioning the microgrid system 102 from a connected state with respect to the electrical grid 104 to a disconnected (or islanded) state, as described in greater detail below. Depending on the embodiment, the control module 120 may be implemented or realized with a processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, and configured to carry out the functions, techniques, and processing tasks associated with the operation of the microgrid system 102 described in greater detail below. Furthermore, the steps of a method or algorithm described in connection with the embodiments disclosed herein may be embodied directly in hardware, in firmware, in a software module executed by the control module 120, or in any practical combination thereof. In accordance with one or more embodiments, the control module 120 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the control module 120, cause the control module 120 to execute, facilitate, or perform one or more of the processes, tasks, operations, and/or functions described herein.

Still referring to FIG. 1, the connection arrangement 106 generally represents one or more switching elements configured to electrically isolate the electrical grid 104 from the microgrid system 102 (e.g., the electrical grid interface 108 and/or the microgrid distribution arrangement 112) under control of the control module 120. In exemplary embodiments, the impedance of the connection arrangement 106 is substantially small such that the voltage and/or current of the electrical grid 104 immediately upstream of the connection arrangement 106 is substantially equal to the voltage and/or current of the electrical grid interface 108 downstream of the connection arrangement 106 when the switching elements are closed or otherwise activated to provide an electrical connection between the electrical grid 104 and the electrical grid interface 108. The connection arrangement 106 may include one or more relays, circuit breakers, fuses, solid-state switches, or the like which are configured electrically in series between the electrical grid interface 108 and the electrical grid 104 and are electrically actuatable by the control module 120. Thus, in a disconnected or deactivated state, the connection arrangement 106 prevents current flow between the electrical grid 104 and the microgrid system 102, thereby islanding the microgrid system 102 relative to the utility 105. Accordingly, the connection arrangement 106 may alternatively be referred to as an Island Interconnect Device (IID). The control module 120 is coupled to the electrical grid 104 via one or more sensing arrangements 115, 118 to detect or otherwise identify an electrical disturbance on the electrical grid 104 and automatically operate the connection arrangement 106 to disconnect the electrical grid interface 108 from the grid 104. The sensing arrangements 115, 118 include one or more voltage sensors and/or current sensors configured to measure, sense, or otherwise quantify the respective electrical characteristic of a respective electrical phase and generate corresponding output signals provided to the control module 120.

As described in greater detail below in the context of FIG. 2, in one or more embodiments, based on the measurements obtained from a sensing arrangement 115, 118, the control module 120 calculates or otherwise determines a reference value for the voltage of the electrical grid 104. For example, the control module 120 may dynamically calculate a moving average value for the voltage at the electrical grid interface 108 for use as a reference grid voltage. The control module 120 may also calculate or otherwise determine an average frequency associated with the voltage at the electrical grid interface 108 in a similar manner. Additionally, the control module 120 continually monitors or analyzes the output signals from a sensing arrangement 115, 118 to detect or otherwise identify an islanding condition based on a sensor output indicative of an electrical disturbance on the electrical grid 104 upstream of the microgrid system 102. For example, the control module 120 may detect a fault condition on the electrical grid 104 based on a difference between an instantaneous voltage at the electrical grid interface 108 and an average or nominal voltage of the electrical grid 104 and/or the electrical grid interface 108 that exceeds an islanding threshold value.

In response to detecting an islanding condition, the control module 120 calculates or otherwise determines a target output voltage for the inverter 124 based on the reference voltage at the electrical grid interface 108, the impedance of the utility grid 105 (that is typically a combination of inductance and resistance), and the output inductance of the inverter 124. The target inverter output voltage value is intended to mitigate the electrical disturbance on the electrical grid 104 by moving the voltage at the electrical grid interface 108 closer towards the normal voltage at the electrical grid interface 108 in the absence of the electrical disturbance during the time period required for the connection arrangement 106 to disconnect the electrical grid interface 108 from the electrical grid 104. In this regard, the relative impedances effectively provide a voltage divider that can be utilized to mitigate a voltage difference between the instantaneous (or current) voltage of the electrical grid 104 and the reference voltage of the electrical grid 104. Thus, while the switches of the connection arrangement 106 are in the process opening, the impact of the upstream electrical disturbance on the downstream electrical components 114, 116 may be reduced by the control module 120 operating the inverter 124 to provide the target voltage at the inverter output 125.

For example, in one embodiment, the control module 120 detects a sag due to a fault condition on the electrical grid 104 when the grid voltage at the electrical grid interface 108 measured by a voltage sensing arrangement 115, 118 falls below 90% of the reference voltage at the electrical grid interface 108 (e.g., the average or nominal voltage during normal operation). Thereafter, the control module 120 determines a target output voltage value based on the measured voltage value at the electrical grid interface 108, the reference voltage value for the electrical grid interface 108, and the relative impedances associated with the inverter output 125 and the electrical grid 104. For example, in one embodiment having a 5% impedance associated with the inverter output 125 and a 10% impedance associated with the electrical grid 104, when the voltage value at the electrical grid interface 108 is 60% of the reference voltage value, the control module 120 calculates a target output voltage for the inverter 124 intended to raise the voltage at the electrical grid interface 108 to the islanding threshold value (e.g., 90% of the reference value). In such an embodiment, the control module 120 determines a target output voltage equal to 105% of the reference voltage value results in a 45% voltage difference (e.g., 45% of the reference voltage) across the impedances. In response to the control module 120 operating the inverter 124 to provide a target output voltage equal to 105% of the reference voltage, causing current to flow across the impedances. In exemplary embodiments, the control module 120 operates the inverter 124 in a voltage source mode in phase with the voltage on the electrical grid 104, which, in turn, results in a current through the inductances that is 90° out of phase, which, in turn, results in an in phase voltage of 20% of the reference voltage value across the impedance of the electrical grid 104 and an in phase voltage of 10% of the reference voltage value across the inverter output impedance. As a result, the voltage at the electrical grid interface 108 is raised from 60% of the reference voltage value to 90% of the reference voltage value while waiting for the connection arrangement 106 to disconnect the electrical grid interface 108 from the electrical grid 104. In one or more embodiments, the maximum target output voltage for the inverter 124 is limited (e.g., less than or equal to 120% of the reference voltage) to prevent the voltage at the electrical grid interface 108 from exceeding a protection threshold once the connection arrangement 106 is opened and the interface 108 is disconnected from the grid 104.

Once the connection arrangement 106 has effectively disconnected the microgrid system 102 from the electrical grid 104, the control module 120 operates the inverter 124 to support an islanded state for the microgrid system 102. For example, the control module 120 may operate the inverter 124 in a voltage-source operating mode to provide electrical energy from the battery 122 to the electrical grid interface 108 and/or the microgrid distribution arrangement 112 in a manner that emulates the electrical grid 104, thereby allowing the components 114, 116 of the microgrid system 102 to maintain normal operation independent of the electrical grid 104. In this regard, the energy storage system 110 may function as an uninterruptible power supply (UPS) when the microgrid system 102 is disconnected from the electrical grid 104.

It should be noted that FIG. 1 depicts a simplified representation of the electrical distribution system 100 for purposes of explanation and is not intended to be limiting. For example, in practice, both the electrical grid 104 and the microgrid system 102 may be realized as three-phase electric systems, with corresponding wiring, lines, and other electrical components to support three-phase operation. Thus, although individual elements, connecting lines, or the like may be depicted in FIG. 1, practical embodiments of the electrical distribution system 100 may include such elements in triplicate, as will be appreciated in the art.

Figure 2:
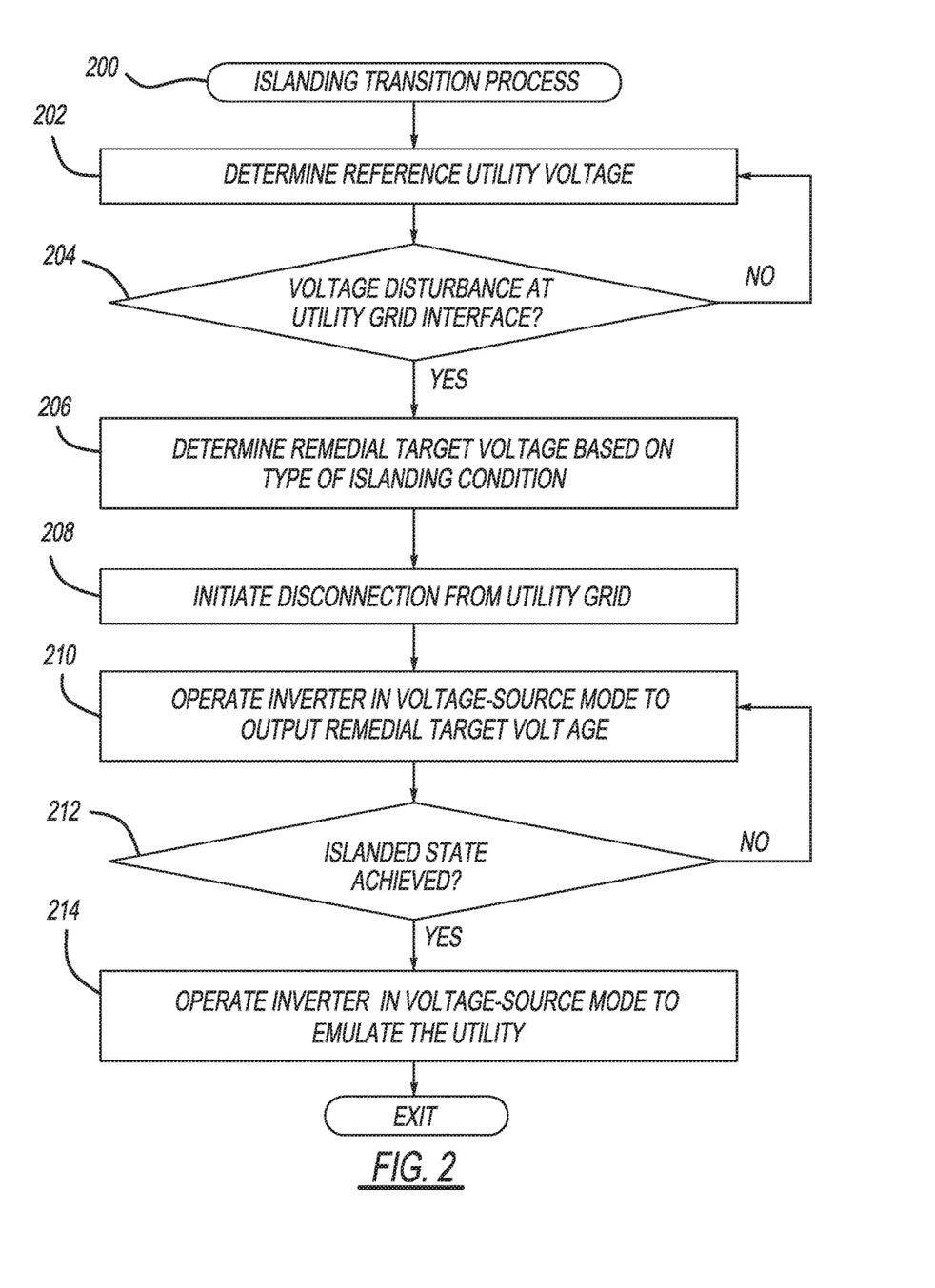
FIG. 2 is a flow diagram of an islanding transition process suitable for use with the electrical distribution system of FIG. 1 in an exemplary embodiment.

Referring now to FIG. 2, in an exemplary embodiment, the microgrid system 102 is configured to support an islanding transition process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the islanding transition process 200 may be performed by different elements of the microgrid system 102, such as, the control module 120, the inverter 124, the connection arrangement 106, and/or one or more of the sensing arrangements 115, 118. It should be appreciated that the islanding transition process 200 may include any number of additional or alternative tasks, the tasks need not be performed in the illustrated order and/or the tasks may be performed concurrently, and/or the islanding transition process 200 may be incorporated into a more comprehensive procedure or process having additional functionality not described in detail herein. Moreover, one or more of the tasks shown and described in the context of FIG. 2 could be omitted from a practical embodiment of the islanding transition process 200 as long as the intended overall functionality remains intact.

The illustrated process 200 begins by calculating or otherwise determining reference values for one or more characteristics of the electrical signals at the utility grid interface and detecting or otherwise identifying an electrical disturbance at the utility grid interface indicative of an islanding condition (tasks 202, 204). In this regard, the control module 120 may continually monitor or otherwise analyze the voltage, current, and/or frequency of the electrical signals at the electrical grid interface 108 via the sensing arrangements 115, 118, and detect an electrical disturbance at the grid interface 108 based on a deviation between the instantaneous measurement value for an electrical characteristic (e.g., a fast RMS voltage) measured by a sensing arrangement 115, 118 and the reference value for that electrical characteristic. For example, the control module 120 may calculate or otherwise determine a moving average of the utility grid voltage at the electrical grid interface 108 and detect a voltage disturbance based on a difference between a recent voltage measured by a sensing arrangement 115, 118 and the moving average for the voltage. In this regard, the control module 120 may calculate the reference utility voltage as a moving average of the utility grid voltage at the electrical grid interface 108 over a preceding time window (e.g., the preceding 10 minutes) and detect an islanding condition when the moving average of the utility grid voltage at the electrical grid interface 108 over a shorter time window (e.g., the preceding half of an electrical cycle) is less than or greater than a threshold percentage of the reference voltage. For example, the control module 120 may detect a sagging fault condition when the recently measured voltage at the electrical grid interface 108 is less than or equal to 90% of the reference voltage value, and conversely, the control module 120 may detect a surging fault condition when the recently measured voltage at the electrical grid interface 108 is greater than 110% of the reference voltage value. In some embodiments, the control module 120 may also determine the frequency of the voltage at the electrical grid interface 108 and detect an islanding condition when the frequency is greater than a maximum frequency threshold or less than a minimum frequency threshold.

In response to detecting an islanding condition, the islanding transition process 200 continues by calculating or otherwise determining a remedial output voltage target for the power conversion module based on the type of islanding condition (task 206). In this regard, in response to a sagging fault condition where the voltage at the electrical grid interface 108 is less than the normal grid voltage (e.g., the average or nominal voltage), the control module 120 determines a remedial target voltage at the inverter output 125 that is greater than the reference utility grid voltage to raise the voltage at the electrical grid interface 108. Conversely, in response to a surging fault condition where the voltage at the electrical grid interface 108 is greater than the normal grid voltage, the control module 120 determines a remedial target voltage at the inverter output 125 that is less than the reference utility grid voltage to reduce the voltage at the electrical grid interface 108.

Additionally, in exemplary embodiments, the remedial target voltage is influenced by the relationship between the inverter output impedance relative to the utility grid impedance. In response to a sagging fault condition, the control module 120 may first calculate or otherwise determine a remedial grid interface target voltage for the electrical grid interface 108 based on the reference voltage of the electrical grid interface 108. For example, the control module 120 may calculate the remedial grid interface target voltage for a sagging condition as 90% of the reference voltage at the electrical grid interface 108. In this regard, the remedial grid interface target voltage may be chosen as a minimum safe supply voltage for the microgrid components 114, 116 to mitigate or otherwise prevent damage to the microgrid components 114, 116, and in some embodiments, the remedial grid interface target voltage may correspond to the islanding condition detection threshold (e.g., where the control module 120 detects a sagging fault condition at 90% of the reference value). Thereafter, based on the remedial grid interface target voltage, the voltage of the electrical grid 108, and a voltage divider corresponding to a ratio of the inverter output impedance to the grid impedance, the control module 120 calculates a remedial target voltage at the inverter output 125 that results in the remedial grid interface target voltage at the grid interface 108 of 90% of the reference voltage by virtue of the voltage divider. Similarly, in response to a surging fault condition, the control module 120 may first calculate a remedial grid interface target voltage as 110% of the reference voltage at the electrical grid interface 108, where the remedial grid interface target voltage may be chosen as a maximum safe supply voltage for the microgrid components 114, 116, which, in some embodiments may also correspond to the surging fault condition detection threshold. The control module 120 then calculates a remedial target voltage output that results in the remedial grid interface target voltage at the grid interface 108 of 110% of the reference voltage based on the voltage of the electrical grid 104 and the ratio of the inverter output impedance to the grid impedance.

Still referring to FIG. 2, the illustrated process 200 continues by initiating disconnection from the utility electrical grid and operating the power conversion module to provide the remedial output voltage target until the microgrid system is in an islanded state (tasks 208, 210, 212). In this regard, the control module 120 commands, signals, or otherwise instructs the connection arrangement 106 to change from a connected (or closed or activated) state to a disconnected (or opened or deactivated) state that prevents current flow to/from the utility grid 104. Thereafter, during the period of time while the connection arrangement 106 transitions from the connected state to the disconnected state, the control module 120 operates the inverter 124 in a voltage source mode to provide the remedial inverter output voltage target at the inverter output 125.

In some embodiments, the control module 120 initiates a timer when the connection arrangement 106 is signaled to disconnect from the grid 104 and detects the microgrid system 102 is islanded when the elapsed time is greater than or equal to a fixed threshold amount of time required for the connection arrangement 106 to complete transitioning from a connected to disconnected state. In other embodiments, the control module 120 continually monitors the voltage at the electrical grid interface 108 via the sensing arrangement 118 and detects or otherwise identifies the islanded state based on the voltage at the grid interface 108. In this regard, as the connection arrangement 106 opens, the influence of the grid impedance in the voltage divider decreases, thereby causing the voltage at the grid interface 108 to trend towards the voltage at the inverter output 125. In some embodiments where the remedial grid interface target voltage for the electrical grid interface 108 is not equal to the reference voltage, the control module 120 detects the islanded state when the voltage at the grid interface 108 returns to the reference voltage value. For example, after a sagging fault condition when the remedial target voltage at the inverter output 125 initially results in the remedial grid interface target voltage at the grid interface 108 of 90% of the reference voltage, the control module 120 may detect the islanded state when the measured voltage obtained via the sensing arrangement 118 is greater than or equal to the reference voltage prior to the sagging fault condition. In other embodiments, the control module 120 detects the islanded state when the voltage at the grid interface 108 is substantially equal to the remedial inverter output voltage target or within a threshold amount of the remedial inverter output voltage target, thereby indicating an absence of the impedance of the electrical grid 104 influencing the voltage at the grid interface 108.

In the illustrated embodiment, after detecting an islanded state, the islanding transition process 200 continues by operating the power conversion module to emulate the utility (task 214). In this regard, the control module 120 commands, signals, or otherwise operates the inverter 124 in a voltage-source mode to provide a voltage at the inverter output 125 that results in the voltage at the electrical grid interface 108 substantially equal to the voltage at the electrical grid interface 108 prior to detection of the islanding condition. For example, the control module 120 may operate the inverter 124 to provide the reference voltage of the electrical grid interface 108 (e.g., from task 202) at the inverter output 125. In some embodiments, when the moving average of the voltage at the electrical grid interface 108 deviates from the nominal voltage by more than a threshold amount (e.g., 5% of the nominal voltage), the control module 120 operates the inverter 124 to provide the nominal voltage for the utility grid 104 at the inverter output 125. Additionally, in some embodiments, the control module 120 may calculate or otherwise determine a reference frequency for the voltage of the electrical grid interface 108 (e.g., at task 202) and operate the inverter 124 to provide the reference voltage of the electrical grid interface 108 with that reference frequency. In this regard, the control module 120 may account for deviations in the frequency as well as deviations in the peak (or RMS) voltage of the electrical grid 104 to emulate the utility 105, thereby mitigating the effects of being in an islanded state on any sensitive microgrid components 114, 116.

Figure 3:
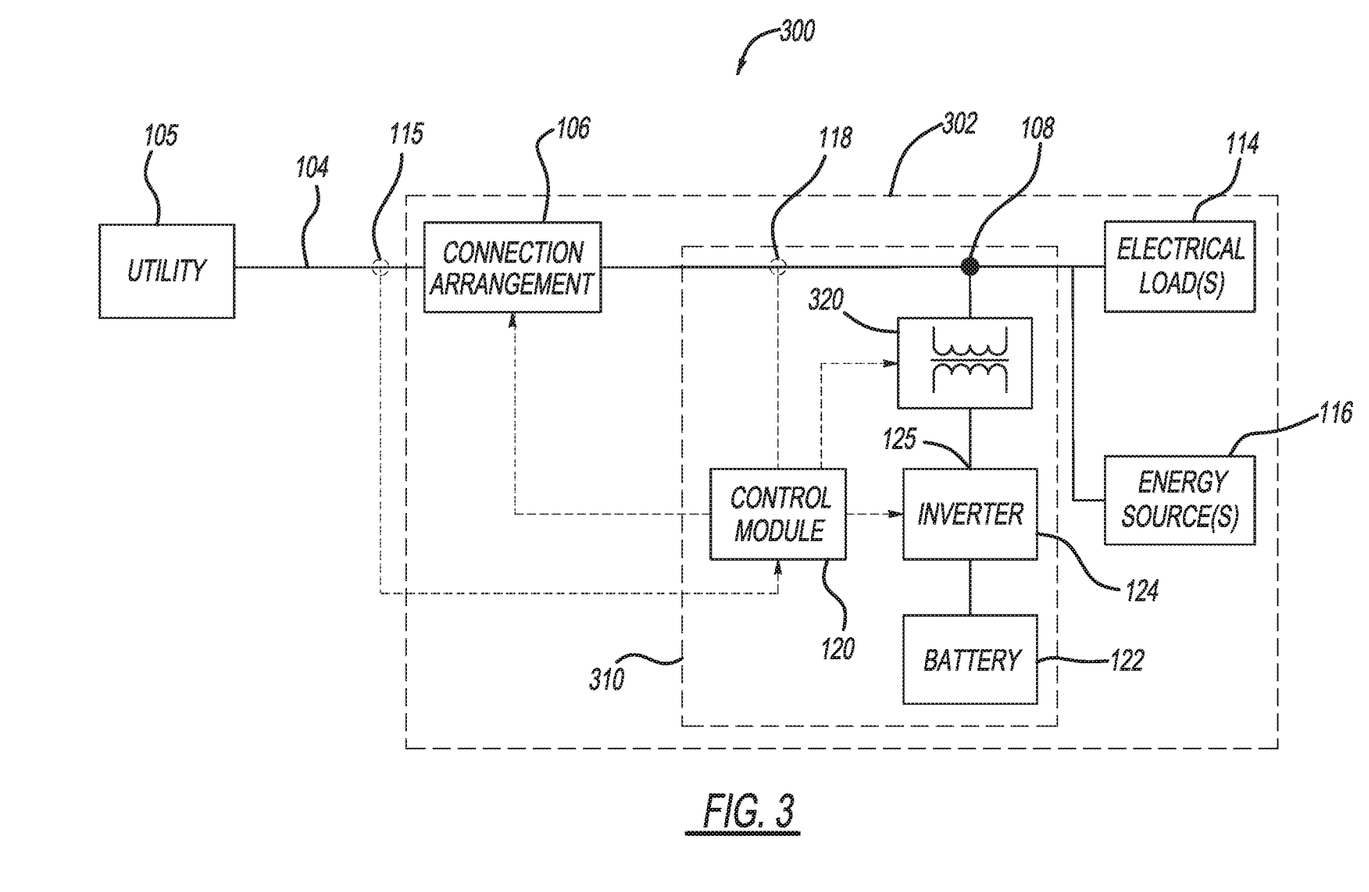
FIG. 3 is a schematic view of another electrical distribution system in one or more exemplary embodiments including a transformer arrangement to balance a plurality of electrical phases.

FIG. 3 depicts another embodiment of an electrical distribution system 300 that includes a microgrid electrical system 302 capable of being selectively connected to an external electrical grid 104 via a connection arrangement 106. Various elements of the electrical distribution system 300 and features associated therewith are similar to those described above in the context of FIG. 1, and accordingly, such common elements and features will not be redundantly described in the context of FIG. 3.

The microgrid system 302 includes an energy storage system 310 including a transformer arrangement 320 coupled electrically in series between the inverter output 125 and the grid interface 108. The transformer arrangement 320 is configured to support balancing the electrical phases at the grid interface 108 in response to an islanding condition on a single phase of the electrical grid 104 (e.g., in response to a single phase to ground fault). In some embodiments, the transformer arrangement 320 is realized as a zigzag transformer configured to balance voltage across three phases. In other embodiments, the transformer arrangement 320 is realized as a transformer configured to selectively balance voltages across three phases in response to a control signal from the control module 120, as described in greater detail below in the context of FIG. 4. In such embodiments, in response to detecting an islanding condition on an individual phase of the utility grid 104 (e.g., a sagging fault condition on a single phase), the control module 120 asserts or otherwise provides a control signal to the transformer arrangement 320 to initiate the transformer arrangement 320 balancing the voltage across three phases prior to operating the inverter 124 to provide the remedial target voltage at the inverter output 125.

Figure 4:
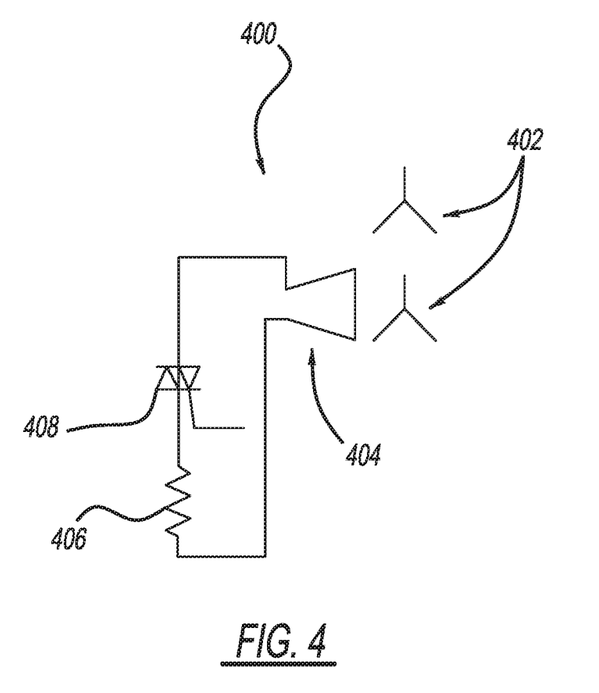
FIG. 4 is a schematic view of an exemplary transformer arrangement suitable for use in the electrical distribution system of FIG. 3 in accordance with one or more exemplary embodiments.

FIG. 4 depicts an embodiment of a transformer arrangement 400 suitable for use as the transformer arrangement 320 in the energy storage system 310 of FIG. 3 to selectively balance voltages through all three electrical phases while operating the inverter 124 to mitigate an electrical disturbance on the utility grid 104. The transformer arrangement 400 includes a pair of wye-configured windings 402 and a delta winding 404 having an open end with a switched resistance configured electrically in series across the opening of the delta winding 404. In this regard, the illustrated switched resistance includes a resistive element 406 (e.g., a resistor or the like) configured electrically in series with a switching element 408 between openings of the delta winding 404. That said, it should be noted that alternative embodiments of the transformer arrangement 400 may not include a resistive element 406 (e.g., a resistance of zero) while still achieving substantially similar functionality.

Referring to FIG. 4 with reference to FIG. 3, a control terminal of the switching element 408 is coupled to the control module 120 to receive a control signal that causes the switching element 408 to turn on, close, or otherwise provide a path for current through the resistive element 406 that closes the open end of the delta winding 404. For example, the switching element 408 may be realized as a silicon-controlled rectifier (SCR) having a gate terminal coupled to a switching control signal output of the control module 120. In response to detecting an islanding condition, the control module 120 asserts or otherwise applies a control signal to the control terminal of the switching element 408 that allows current to flow through the delta winding 404, thereby balancing the voltage across all three phases at the electric grid interface 108 in response to a line-to-line or single phase fault condition. Thereafter, the control module 120 initiates transitioning the connection arrangement 106 to an islanded state and operates the inverter 124 to provide a remedial target voltage at its output 125. Thus, the remedial target voltage at the inverter output 125 combined with the phase balancing provided by the transformer arrangement 320, 400 results in a voltage at the electrical grid interface 108 that mitigates the impact of the electrical disturbance on the electrical grid 104 on the components 114, 116 of the microgrid system 302.

Referring to FIGS. 1-3, in one or more embodiments, the control module 120 identifies or otherwise determines a location (or direction) of the electrical disturbance relative to the grid interface 108 and only initiates the islanding transition process 200 based on the location of the electrical disturbance being upstream of the microgrid system 102, 302 and residing somewhere on the utility grid 104 external to the microgrid system 102, 302. For example, based on the real and reactive power flow at the electrical grid interface 108, the control module 120 may determine whether a fault condition is upstream of the electrical grid interface 108 (e.g., when the power flow indicates increased current to the grid 104 by the microgrid system 102 supplying fault current VARS to the utility grid 104) or downstream of the electrical grid interface 108 (e.g., when the power flow indicates increased current to the microgrid distribution arrangement 112 by the utility 105 supplying VARS to the microgrid system 102 or increased power consumption by the microgrid system 102). Thus, for electrical disturbances within the microgrid system 102, 302, the energy storage system 110, 310 may maintain normal operation and allow the utility 105 and/or utility grid 104 to address the fault condition. Conversely, when the control module 120 determines that the electrical disturbance triggering an islanding condition is upstream of the electrical grid interface 108 and residing on the utility grid 104, the control module 120 automatically initiates operation of the connection arrangement 106 to disconnect the microgrid system 102, 302 from the utility grid 104 while concurrently operating the inverter 124 to mitigate the effects of the electrical disturbance on the voltage at the electrical grid interface 108.

To briefly summarize, the subject matter described herein mitigates the effect of a utility grid disturbance on the voltage microgrid components are exposed to at the grid interface. By allowing a power inverter to be overloaded and operated in a voltage source mode at the average or nominal voltage of the utility grid prior to the disturbance and in phase with the utility grid voltage, the reactive power capabilities of the inverter can be leveraged to temporarily improve the voltage at the grid interface while the microgrid system is concurrently being disconnected from the utility grid. As a result of the inverter output voltage being in phase with the utility voltage, the inductance between the inverter output and the electrical grid interface results in a current that is 90° out of phase, resulting in reactive power flow that is in the direction needed to restore the voltage in the direction of nominal. Once the target inverter output voltage is determined that compensates for the electrical disturbance, the phase angle of the inverter output voltage can be chosen to achieve a desired real power flow to/from the battery. Thus, the direction of power flow within the microgrid system may be maintained substantially the same during the islanding transition while also mitigating the voltage disturbance at the electrical grid interface.

For the sake of brevity, conventional techniques related to three-phase electrical systems, electrical energy generation and distribution, transformer configurations, line impedances, circuit breakers, electromechanical switches, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements with direct electrical connections, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. An electrical system comprising:
    a sensing arrangement coupled to an electrical grid interface to measure an electrical characteristic of the electrical grid interface;
    a power conversion module having an output coupled to the electrical grid interface; and
    a control module coupled to the sensing arrangement and the power conversion module to:
        determine a reference value for the electrical characteristic;
        identify an islanding condition based on a difference between the electrical characteristic and the reference value;

determine a target output value for the power conversion module to counteract an electrical disturbance at the electrical grid interface based on the difference; and in response to the islanding condition:
operate the power conversion module to provide the target output value for the electrical characteristic at the output during a time period required to disconnect the output from the electrical grid interface; and
operate the power conversion module to provide the reference value for the electrical characteristic at the output after disconnection from the electrical grid interface.

2. The electrical system of claim 1, the output of the power conversion module being coupled to the electrical grid interface via an impedance, wherein the target output value at the output is configured to result in the reference value at the electrical grid interface based on the impedance.

3. The electrical system of claim 1, wherein:
the electrical characteristic comprises a grid voltage;
the reference value comprises an average value for the grid voltage; and
the target output value comprises a target output voltage.

4. The electrical system of claim 3, further comprising an energy source, wherein:
the power conversion module comprise a power inverter coupled between the energy source and the electrical grid interface; and
the control module operates the power inverter in a voltage source mode to provide the target output voltage at the output.

5. The electrical system of claim 1, further comprising a connection arrangement coupled between the electrical grid interface and an electrical grid, wherein the control module is coupled to the connection arrangement to initiate disconnection of the electrical grid from the electrical grid interface in response to the islanding condition.

6. The electrical system of claim 5, wherein:
the electrical characteristic comprises a grid voltage for the electrical grid;
the reference value comprises an average value for the grid voltage;
the target output value comprises a target output voltage;
the power conversion module comprise a power inverter coupled between an energy source and the electrical grid interface; and
the control module operates the power inverter in a voltage source mode to provide the target output voltage at the output in response to the islanding condition.

7. The electrical system of claim 6, wherein in response to the disconnection, the control module operates the power inverter in the voltage source mode to provide the reference value at the output.

8. The electrical system of claim 1, wherein:
the electrical characteristic comprises a voltage; and
the reference value comprises an average voltage of the electrical grid interface.

9. The electrical system of claim 8, the target output value comprising a target output voltage, wherein the control module determines the target output voltage based at least in part on a relationship between a first impedance between the output of the power conversion module and the electrical grid interface and a second impedance associated with an electrical grid coupled to the electrical grid interface.

10. The electrical system of claim 9, wherein the control module determines the target output voltage based on the relationship between the first impedance and the second impedance with respect to a second relationship between the voltage of the electrical grid interface and the average voltage of the electrical grid interface.

11. The electrical system of claim 8, wherein:
the islanding condition comprises a sag condition; and
the target output value comprises a target output voltage greater than the average voltage of the electrical grid interface.

12. The electrical system of claim 8, wherein:
the islanding condition comprises a surge condition; and
the target output value comprises a target output voltage less than the average voltage of the electrical grid interface.

13. The electrical system of claim 1, further comprising a transformer arrangement coupled between the output of the power conversion module and the electrical grid interface, wherein the control module is coupled to the transformer arrangement to signal the transformer arrangement to balance the electrical characteristic at the electrical grid interface while operating the power conversion module to provide the target output value.

14. An electrical system comprising:
a connection arrangement coupled in series between an external electrical grid and an electrical grid interface node;
a voltage sensing arrangement coupled to the electrical grid interface node to measure a voltage at the electrical grid interface node; and
an energy storage system comprising:
an energy storage element;
an inverter module coupled between the energy storage element and the electrical grid interface node, the inverter module having an output coupled to the electrical grid interface node; and
a control module coupled to the voltage sensing arrangement and the inverter module to:
determine a reference voltage at the electrical grid interface node;
identify an islanding condition based on the measured voltage relative to the reference voltage;
determine a target output voltage for the inverter module to counteract an electrical disturbance on the external electrical grid based on the measured voltage relative to the reference voltage; and
in response to the islanding condition:
operate the connection arrangement to electrically disconnect the electrical grid interface node from the external electrical grid; and
operate the inverter module in a voltage source mode to provide the target output voltage at the output during a time period required for the connection arrangement to disconnect the electrical grid interface node from the external electrical grid.

15. The electrical system of claim 14, further comprising a transformer arrangement coupled between the output of the inverter module and the electrical grid interface node, wherein the control module is coupled to the transformer arrangement to operate the transformer arrangement to signal the transformer arrangement to balance an electrical characteristic at the electrical grid interface node while operating the inverter module to provide the target output voltage when the islanding condition comprises a single phase fault condition or a line-to-line fault condition.

16. The electrical system of claim 14, wherein the control module operates the inverter module in a current source mode prior to the islanding condition.

17. The electrical system of claim 14, wherein the energy storage element comprises a battery.

18. A method of transitioning a microgrid system to an islanded state, the microgrid system including an electrical grid interface coupled to an external electrical grid via a connection arrangement, the method comprising:
- determining a reference value for an electrical characteristic at the electrical grid interface based on measurements obtained via one or more sensing arrangements;
- identifying an islanding condition based on a difference between a measurement obtained via the one or more sensing arrangements relative to the reference value;
- determining a target output value for a power conversion module coupled between the electrical grid interface and an energy storage element to counteract an electrical disturbance at the electrical grid interface based on the difference; and
- in response to the islanding condition:
    - operating the connection arrangement to electrically disconnect the electrical grid interface from the external electrical grid;
    - operating the power conversion module to provide the target output value for the electrical characteristic during a time period required for the connection arrangement to disconnect the electrical grid interface from the external electrical grid; and
    - operating the power conversion module to provide the reference value for the electrical characteristic after disconnecting the electrical grid interface from the external electrical grid.

19. The method of claim 18, wherein:
- determining the reference value comprises determining an average voltage at the electrical grid interface based on the measurements obtained via the one or more sensing arrangements;
- determining the target output value comprises determining a target output voltage for the power conversion module based on the difference between a measured voltage and the average voltage; and
- operating the power conversion module to provide the target output value comprises operating the power conversion module in a voltage source mode to provide the target output voltage.

20. The method of claim 18, wherein determining the target output value comprises determining the target output value for achieving the reference value at the electrical grid interface based at least in part on the measurement, the reference value, and an impedance between the power conversion module and the electrical grid interface.

* * * * *